United States Patent [19]
Thurston

[11] 3,815,359
[45] June 11, 1974

[54] IGNITION SYSTEM FOR ROCKETS

[75] Inventor: James R. Thurston, Brigham City, Utah

[73] Assignee: Thiokol Chemical Corporation, Bristol, Pa.

[22] Filed: Feb. 23, 1966

[21] Appl. No.: 529,488

[52] U.S. Cl.................................. 60/254, 60/256
[51] Int. Cl............................................. F02k 9/04
[58] Field of Search............... 60/254, 256, 39.82 E; 102/49.7, 102, 70, 70.2

[56] References Cited
UNITED STATES PATENTS 2,988,877   6/1961   Shope........................... 60/39.82 E
3,248,875   5/1966   Wolcott.............................. 60/254

Primary Examiner—Samuel Feinberg
Attorney, Agent, or Firm—Edward E. McCullough

[57] ABSTRACT

A stack of igniters, individually responsive to electrical signals, is disposed either centrally or peripherally in the grain of an end-burning, solid-propellant rocket having capability of combustion extinguishment in flight, for reignition at any stage of propellant consumption; both igniters and associated electrical wiring being protected from premature destruction by special thermal insulation.

10 Claims, 8 Drawing Figures

PATENTED JUN 11 1974

INVENTOR.
JAMES R. THURSTON
BY Edward E. McCullough
AGENT

INVENTOR.
JAMES R. THURSTON

BY Edward E. McCullough
AGENT

INVENTOR.
JAMES R. THURSTON
BY Edward E. McCullough
AGENT

IGNITION SYSTEM FOR ROCKETS This invention relates broadly to ignition systems for gas generators having solid propellant, and particularly to repeating ignition systems for rockets having solid propellant grains and having the capability of stopping the combustion thereof.

Capability of stopping and restarting the operation of solid-propellant rockets in flight has been a long-recognized need. Although means have been demonstrated for extinguishing the combustion of such a rocket, generally by injection of water or other liquid coolant, the need for reliably reigniting a solid propellant rocket has heretofore remained unsatisified.

Accordingly, the present invention is, briefly, an ignition system for repeatedly igniting a rocket having a solid-propellant grain, the combustion of which may be repeatedly terminated. Means for terminating such combustion is not a part of this invention.

Another object of the invention is to provide a means for re-igniting such a rocket motor as many times as desired, so long as there is still propellant left to burn.

Another object of the invention is to provide means for reigniting such a rocket motor at any stage of the consumption of propellant.

Other objects and advantages of the invention will become apparent as the following description is read with reference to the accompanying drawings, wherein the same parts are designated by identical characters throughout the views.

Figures 1, 2:
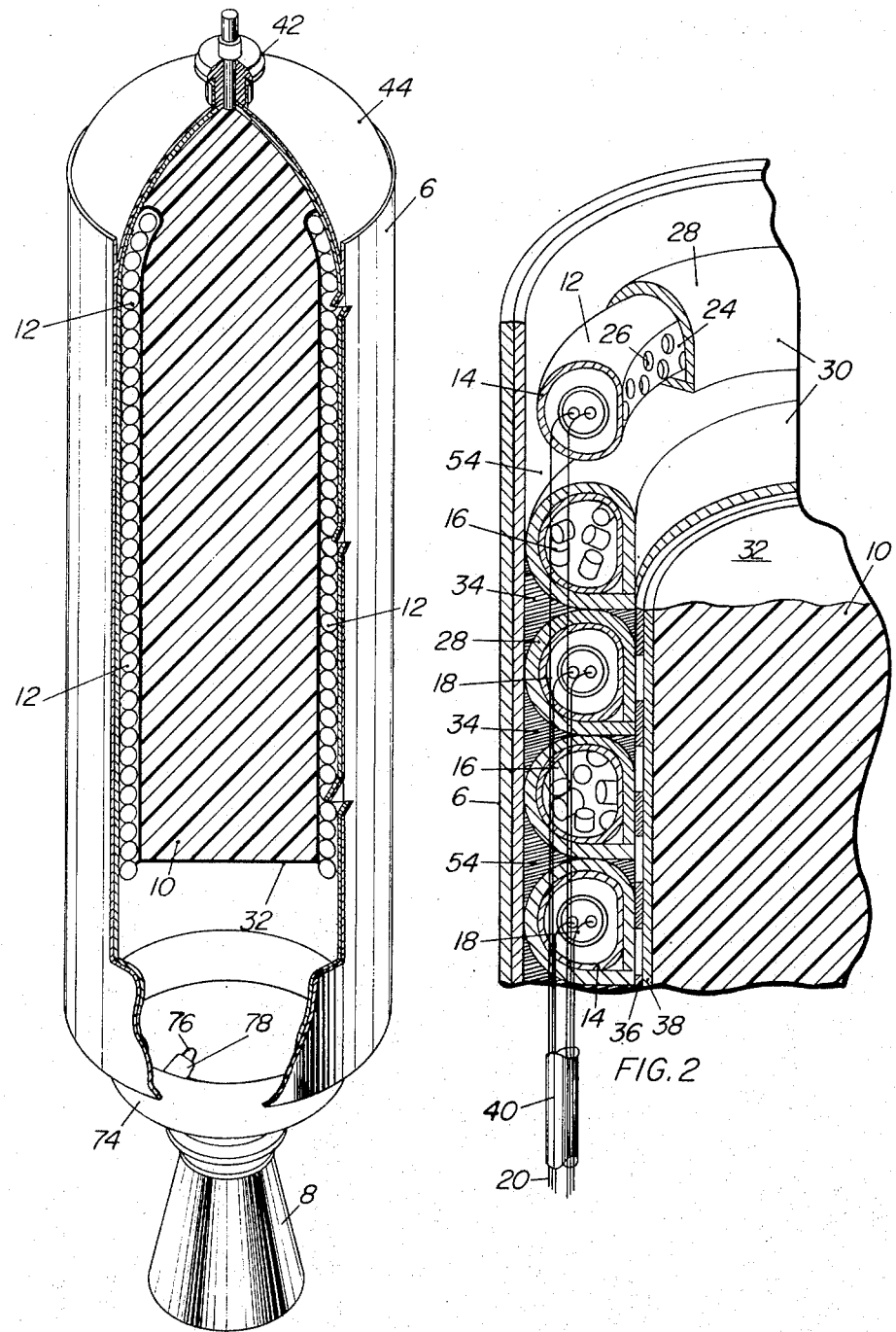
FIG. 1 is a perspective view, with some parts broken away, of a solid propellant rocket motor containing the invention.
FIG. 2 is a fragmentary perspective view, partially sectioned and enlarged in scale, showing the invention in a position rotated 180° from that shown in FIG. 1.

FIG. 1 illustrates the preferred embodiment of the invention installed in a solid propellant rocket motor having a conventional case 6 equipped with a nozzle 8 and loaded with a solid propellant, end-burning grain 10. A series of annular igniters 12 surrounds the propellant grain 10 on the inside of the case 6. As shown in FIG. 2, each annular igniter 12 is a steel tube 14 filled with flammable pellets 16. The flammable pellets 16 are typically composed by weight of:

| | |
|---|---|
| Boron | 23.85% |
| Potassium nitrate | 71.20 |
| Polyamide resin | 3.95 |
| Graphite powder | 1.00 |

Combustion is initiated in each igniter 12 by an electric squib 18, in communication with a power supply, not shown, by means of electrical conductors 20. Non-electrical systems could employ any of a number of other primers, rather than the squib 18. The inner-peripheral wall 24 of each tube 14 contains perforations 26 to direct the flaming gases from the igniter 12 onto the exposed face of the propellant 10.

Figure 3:
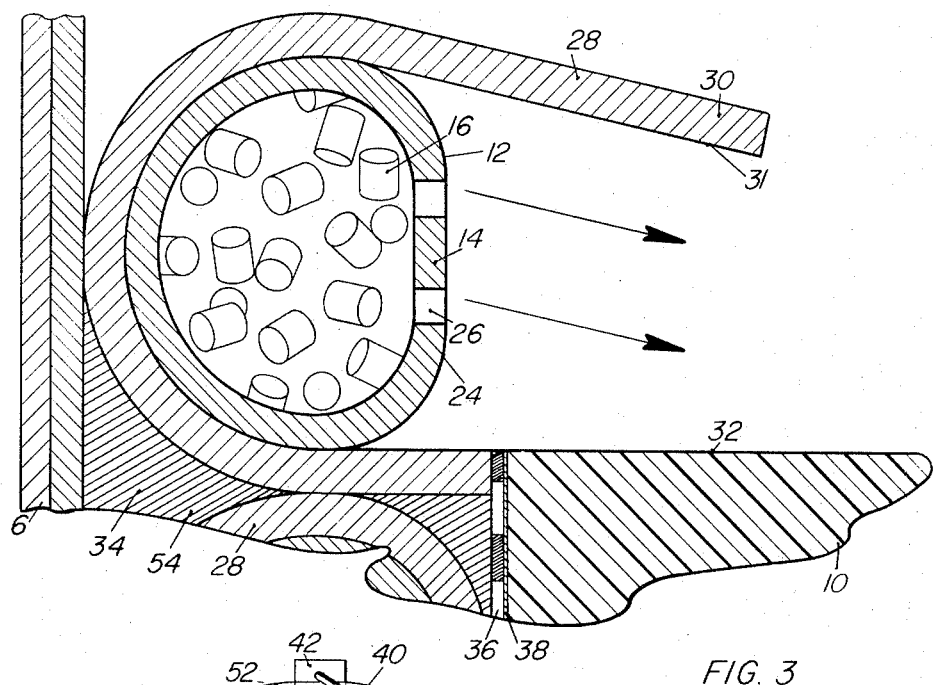
FIG. 3 is a greatly-enlarged section of one of the igniters in operation.

Each tube 14 is incased in an asbestos jacket 28 which is wrapped around it longitudinally leaving an annular flap 30 over the perforations 26. Each flap 30 is wrapped to extend in the direction in which the combustion of propellant progresses; so that it may form a canopy 31 to direct the flaming gases from the perforations 26 onto the surface of the propellant when pressure from the burning pellets 16 is sufficient to force the flap 30 away from the tube 14. This is advantageously shown in FIG. 3. The annular igniters 12 with the asbestos jackets 28 are embedded in a potting composition 34 composed by weight of:

| | |
|---|---|
| Carboxyl-terminated polybutadiene | 76.5% |
| Tris [1-(2-methyl) aziridinyl] phosphine oxide | 9.5 |
| Trifunctional epoxy resin | 6.5 |
| Iron octoate | 7.5 |

A perforated sheet 36 of asbestos lines the inner side of the series of igniters 12, complete with their asbestos jackets 28. The asbestos sheet 36 is coated on the outside thereof with an adhesive liner 38 for adhesion to the propellant 10. This liner 38 is typically composed by weight of:

| | |
|---|---|
| Carboxyl terminated polybutadiene polymer | 83.0% |
| Tris [1-(2-methyl) aziridinyl] phosphine oxide | 2.4 |
| Trifunctional epoxy resin | 1.6 |
| Asbestos floats | 10.0 |
| Iron octoate | 1.0 |
| Tri glyceride of hydroxy stearic acid | 2.0 |

A conduit 40 incases the electrical conductors 20 from the igniters 12 to a multiple electrical connector 42 located on the forward end 44 of the rocket motor case 6. In the preferred embodiment of the invention, each tubular annulus 14 is actually composed of two semicircular tubes in abutting arrangement, each semicircular tube having closed ends. In this way, a redundant ignition system may be formed, each semicircular tube being an independent igniter requiring its own electrical conductors and squib; so that the motor may still be reliably ignited even if one of each pair fails. Hence, the preferred embodiment of the invention requires two conduits 40 leading to the electrical connector 42. Each conduit 40 is filled with the potting composition 34, in which the electrical conductors 20 are embedded, so that, as the face 32 of the propellant recedes and allows the conduit 40 to be consumed, flaming gases will not enter therein and destroy the unused electrical wiring 20.

Figure 4:
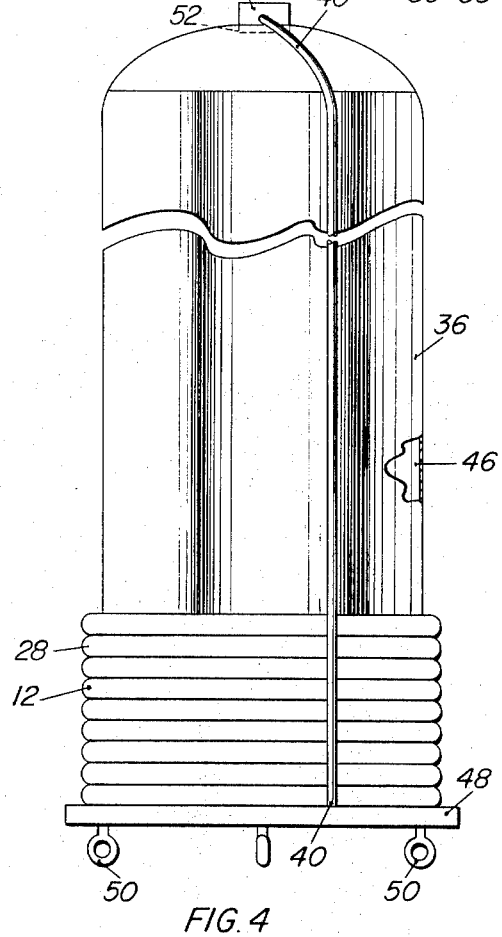
FIG. 4 is a side elevation of apparatus for manufacturing the invention.

FIG. 4 illustrates apparatus for manufacturing the ignition system described. The perforated sheet 36 of asbestos is first wrapped onto the surface of a mandrel 46 having the form of the interior of the rocket motor case 6, but allowing room therein for the thickness of the ignition system described. The annular igniters 12 are then stacked on the mandrel 46, as shown, against a stop means 48. Such a mandrel has handling means in the form of eyes 50. The electrical conductors 20 are then arranged to pass through each conduit 40, which is then bent to conform to the longitudinal surface of the mandrel 46. The conductors 20 enter the conduits 40 through holes, not shown, which are sealed with the potting composition 34. Electrical connections are then made to the multiple connector 42, which is seated in a central recess 52 in the forward end of the mandrel 46. A rocket-motor case 6 is then lined wwth a thin coat of the adhesive liner 38. This composition is brought to a state of partial cure by being subjected to a temperature of about 135° F for about 40 hours. The entire assembly on the mandrel 46 is then inserted into the rocket motor case 6 and the potting composition 34 is forced under high pressure into the interstices 54 between the igniter jackets 28. This potting composition 34 is then cured to a solid, rubbery state by subjection to about 135° F temperature for about 24 hours, after which the mandrel 46 is removed. A thin coating of the adhesive liner 38 is then applied to the surface of the asbestos sheet 36 and is partially cured at about 135° F for about 40 hours. The solid propellant 10 is then cast into the motor and cured in a conventional manner well known in the art.

In operation, an electrical signal fires the squib 18 of the first igniter 12, which as shown is positioned above the surface 32 of the propellant 10. If all igniters 12 are embedded in the propellant, the first ignition may be by other means, not shown. The other igniters 12, being positioned below the burning surface 32 of the propellant 10 are protected from heat by the thermal insulation properties of the propellant 10 and of the potting composition 34. As the pyrotechnic pellets 16 are ignited by the squib 18, large quantities of flaming gases are discharged through the perforation 26 and are directed onto the face 32 of the propellant 10 by orientation of the perforations 26 and by the action of the flap 30 which is forced away from the perforations 26 by the gases generated. As the propellant surface 32 recedes, the igniters 12 are exposed one by one to the flaming gases generated by the propellant; so that autoignition of each igniter occurs as it is so exposed. However, since the specific igniter 12 relied upon to reignite the rocket after combustion has been interrupted must obviously be free of the propellant 10 (i.e. it must be positioned above the exposed propellant face 32), the thermal conductivity of the asbestos jackets 28 is carefully calculated relative to the propellant burning rate so that heatinduced ignition of a given exposed igniter 12 will not occur until at least one other igniter also becomes exposed by the receding face 32 of the propellant 10.

The electric squibs 18 are of the resistance wire type so that small, extraneous currents may pass therethrough without firing the squib 18. Hence, electrical connections to the still unfired igniters 12 are all closed circuits, while those to the consumed igniters 12 are all open circuits. Therefore, by telemetry means well known in the art, indicators on ground control apparatus may show which igniters are available for firing; and, hence, which igniter should be fired for reignition after combustion of the propellant 10 has been extinguished. While means for extinguishment of propellant combustion is not a part of this invention, it is indicated generally in FIG. 1, where an annular tank 74 may feed a pressurized coolant onto the flaming surface 32 of the propellant 10 through suitable nozzles 76, the coolant being metered through a valve means 78 responsive to operational means well known in the art.

Figure 5:
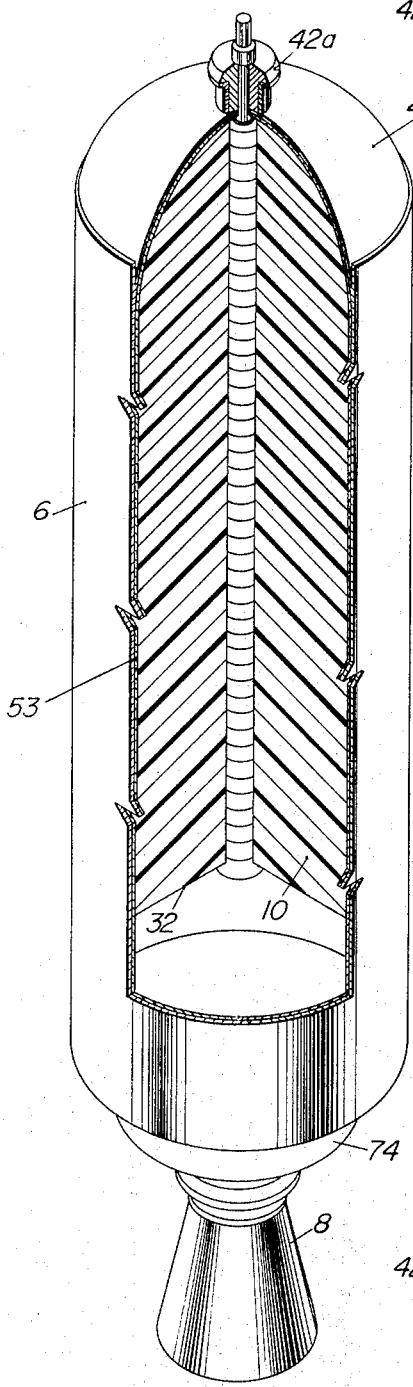
FIG. 5 is a perspective view, with some parts broken away, of a solid propellant rocket motor containing a second embodiment of the invention.
Figure 6:
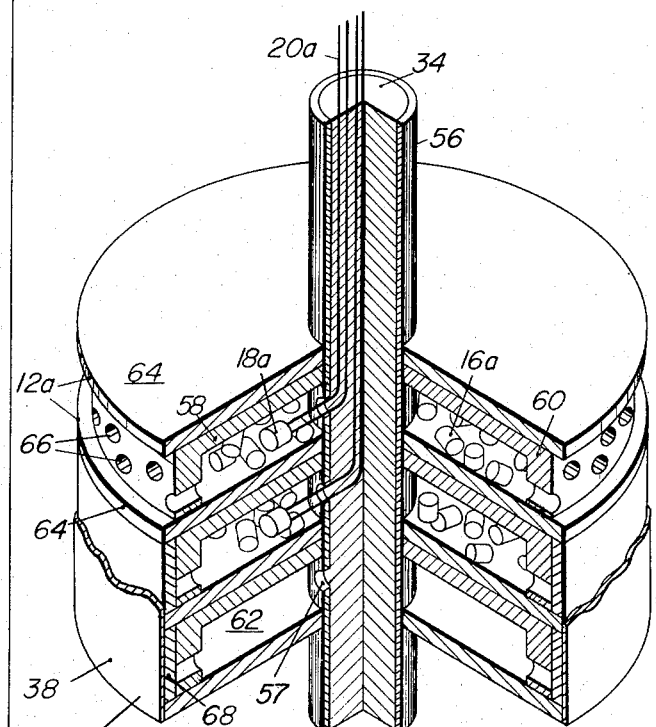
FIG. 6 is an enlarged view, with some parts broken away, of the embodiment of the invention shown in FIG. 5.

An alternate embodiment of this invention is illustrated in FIGS. 5 and 6. In this embodiment the igniters 12a are roughly disk shaped and have central holes so that they may be stacked on a central spindle 56 as shown. The strucutre of the igniters 12a is best shown in FIG. 6. A stainless steel disk 58 having a perforated annular flange 60 at the outer periphery thereof forms an enclosure 62 with an asbestos disk 64 for each igniter 12a. The flange 60 is slightly recessed relative to the edges of the disks 58 and 64. Each enclosure 62 is filled with flammable pellets 16a ignitable by an electric squib 18 in a manner similar to that described for the previous embodiment. The perforations 66 are protected by an annular strip of asbestos cloth 68, and the entire exterior of the asbestos-enclosed stack of igniters is coated with the adhesive liner 38 to which the propellant 10 is bonded. The spindle 56, being tubular, also serves as a conduit through which electrical conductors 20a pass from the squibs 18a via holes 57 in the conduit wall to a multiple connector 42a which is positioned on the forward end of the rocket motor case in a manner identical to that of the previously described embodiment. For the same reason cited in the previous embodiment, the spindle-conduit 56 is filled with the potting composition 34. The combustion extinguishment means similar to that described is indicated generally at 74; the nozzle and valve means not shown.

Operation of this embodiment of the invention is identical to that previously described except that the surface of the propellant 10 is ignited from the center thereof rather than from the outer periphery, and the asbestos jacket does not provide directional control for the flaming gases.

Figure 7:
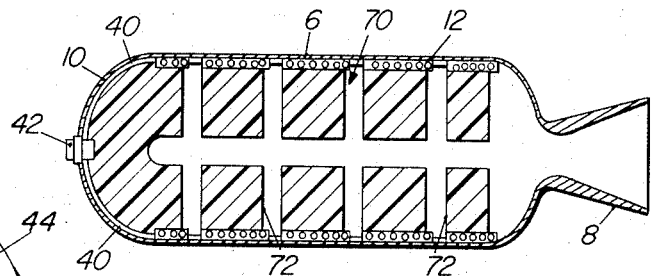
FIG. 7 is a sectional view of a rocket motor to show how the invention may be used in a rocket motor having a slotted grain.

FIG. 7 shows how the preferred embodiment of this invention may be applied to a rocket motor having a different propellant grain configuration 70 but incorporating end-burning surfaces 72.

Figure 8:
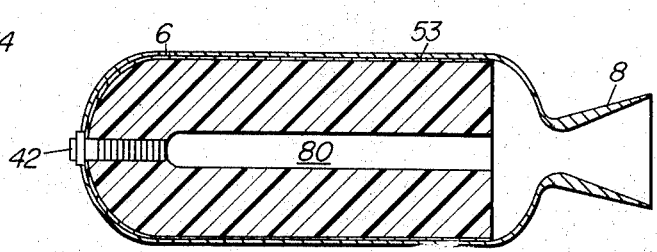
FIG. 8 is a view similar to FIG. 7 showing a second embodiment of the invention in a rocket having a central combustion chamber.

FIG. 8 shows how the second embodiment of the invention may be used in a conventional solid-propellant rocket having a central combustion chamber 80.

Although the invention has been described with considerable specificity, it should be noted that detail elements may be varied considerably without departing from the scope of the invention, which is defined in the following claims.

What is claimed is:

1. An ignition system for repeatedly igniting a solid-propellant grain in a rocket, having the capability of extinguishing combustion thereof, comprising:

a stack of containers having perforations, said containers being embedded in said propellant so that they become exposed serially as said propellant grain is consumed;

flammable material in each of said containers, and said perforations in each said container being arranged to direct burning gases from combustion of said flammable material onto the surface of said propellant as consumption thereof exposes said perforations;

a primer in each of said containers for igniting said flammable material; and a coat of adhesive liner on said ignition system for bonding to adjacent materials.

2. The ignition system of claim 1 wherein said adhesive liner comprises approximately by weight:

| | |
|---|---|
| Carboxyl terminated polybutadiene polymer | 83.0% |
| Tris [1-(2-methyl) aziridinyl] phosphine oxide | 2.4 |
| Trifunctional epoxy resin | 1.6 |
| Asbestos floats | 10.0 |
| Iron octoate | 1.0 |
| Tri glyceride of hydroxy stearic acid | 2.0 |

3. The ignition system of claim 1 wherein:
said containers are annular tubes and said perforations are arranged in the inner periphery of each of said tubes; and further including:
a jacket of thermal insulation wrapped longitudinally around each of said containers to form an annular flap extending over said perforations in the direction in which combustion of said propellant progresses, whereby said flap may function as a canopy to help direct flaming gases from combustion of said flammable material onto the surface of said propellant grain.

4. The ignition system of claim 3 further including:
a potting composition in the interstices between adjacent thermal insulation jackets of said tubular containers.

5. The ignition system of claim 4 wherein said potting composition comprises approximately by weight:

| | |
|---|---|
| Carboxyl-terminated polybutadiene | 76.5% |
| Tris [1-(2-methyl) aziridinyl] phosphine oxide | 9.5 |
| Trifunctional epoxy resin | 6.5 |
| Iron octoate | 7.5 |

6. The ignition system of claim 1 wherein:
each of said containers is a semicircular tube with closed ends.

7. The ignition system of claim 1 wherein:
said containers are substantially disk shaped.

8. The ignition system of claim 7 wherein:
each of said containers has a hole therethrough; and said ignition system further includes:
a spindle passing through said hole in each of said containers, whereby they may be aligned in a stack.

9. The ignition system of claim 8 wherein:
said spindle is a hollow tube for conducting electrical wiring; and further including:
a potting composition in said hollow tube to fill spaces therein around said wiring.

10. The ignition system of claim 3 wherein said jacket of thermal insulation is made of asbestos.

* * * * *